United States Patent
Ilev et al.

(10) Patent No.: US 8,456,738 B2
(45) Date of Patent: Jun. 4, 2013

(54) ULTRAHIGH-RESOLUTION FIBER-OPTIC CONFOCAL MICROSCOPE AND METHOD

(75) Inventors: Ilko K. Ilev, Rockville, MD (US); Ronald W. Waynant, Clarksville, MD (US); Israel Gannot, Kensington, MD (US); Amir H. Gandjbakhche, Potomac, MD (US)

(73) Assignee: The United States of America, as Represented by the Secretary, Department of Health and Human Services, Washington, DC (US)

( * ) Notice: Subject to any disclaimer, the term of this patent is extended or adjusted under 35 U.S.C. 154(b) by 643 days.

(21) Appl. No.: 11/918,313

(22) PCT Filed: Apr. 14, 2006

(86) PCT No.: PCT/US2006/014162
§ 371 (c)(1),
(2), (4) Date: Feb. 6, 2009

(87) PCT Pub. No.: WO2006/113482
PCT Pub. Date: Oct. 26, 2006

(65) Prior Publication Data
US 2009/0225409 A1    Sep. 10, 2009

Related U.S. Application Data

(60) Provisional application No. 60/671,104, filed on Apr. 14, 2005.

(51) Int. Cl.
*G02B 21/00*    (2006.01)
(52) U.S. Cl.
USPC ............ 359/368; 359/385; 250/227.2

(58) Field of Classification Search
USPC .................................. 359/368–393
See application file for complete search history.

(56) References Cited

U.S. PATENT DOCUMENTS

| 4,572,949 | A |   | 2/1986 | Bowers et al. |
| 5,120,953 | A | * | 6/1992 | Harris ...................... 250/227.2 |
| 5,161,053 | A |   | 11/1992 | Dabbs |
| 5,194,918 | A | * | 3/1993 | Kino et al. ..................... 356/497 |

(Continued)

FOREIGN PATENT DOCUMENTS

JP    4-42041    *  2/1992

OTHER PUBLICATIONS

Rea, N.P., et al., "Semiconductor laser confocal and interference microscopy," Optics Communications, 125 (1996), pp. 158-167.

(Continued)

*Primary Examiner* — Thong Nguyen
(74) *Attorney, Agent, or Firm* — Polsinelli PC; Teddy C. Scott, Jr.; Robert Enyard

(57) ABSTRACT

An ultrahigh-resolution fiber-optic confocal microscope has an illumination system; three single-mode optical fibers, each optically coupled to a fiber coupler; a sample support stage arranged to receive illumination radiation from an end of one of the single-mode optical fibers; a detector arranged to receive output radiation from one of the single-mode optical fibers; and a lock-in amplifier electrically connected to the detector and the illumination system. The illumination system is adapted to provide illumination radiation that has a time-varying strength that is correlated with the detector by the lock-in amplifier.

14 Claims, 13 Drawing Sheets

U.S. PATENT DOCUMENTS

| | | | | |
|---|---|---|---|---|
| 5,241,364 A | * | 8/1993 | Kimura | 356/491 |
| 5,748,317 A | * | 5/1998 | Maris et al. | 356/502 |
| 5,785,651 A | * | 7/1998 | Kuhn et al. | 600/310 |
| 6,208,886 B1 | * | 3/2001 | Alfano et al. | 600/473 |
| 6,320,174 B1 | | 11/2001 | Triantafyllos et al. | |
| 6,324,419 B1 | * | 11/2001 | Guzelsu et al. | 600/476 |
| 6,351,325 B1 | * | 2/2002 | Mandella et al. | 359/210.1 |
| 6,376,836 B1 | * | 4/2002 | Anlage et al. | 250/234 |
| 6,750,063 B1 | * | 6/2004 | Kawamura | 436/164 |
| 6,777,656 B2 | * | 8/2004 | Narita et al. | 250/201.3 |
| 2003/0184758 A1 | * | 10/2003 | Bjarklev et al. | 356/479 |
| 2005/0073693 A1 | * | 4/2005 | DePue et al. | 356/499 |
| 2008/0278712 A1 | * | 11/2008 | Ilev | 356/125 |

OTHER PUBLICATIONS

Ilev, I.K., et al., "Duel-confocal fiber-optic method for absolute measurement of refractive index and thickness of optically transparent media," Opt. Lett., 27(19), pp. 1693-1695, Oct. 1, 2002.

Betzig, E., et al., "Single molecules observed by near-field scanning optical microscopy," Science, 262, pp. 1422-1425, 1993.

Lewis, A., et al., "Near-field scanning optical microscopy in cell biology," Trends in Cell Biology, 9, pp. 70-73, 1999.

Lee, C., et al., "Noninterferometric differential confocal microscopy with 2-nm depth resolution," Optics Communications, 135, (1997), pp. 233-237.

Lee, C., et al., "Optical measurement of the viscoelastic and biochemical responses of living cells to mechanical perturbation," Optics Letters, 23(4), pp. 307-309, Feb. 15, 1998.

Corle, T., et al., "Confocal scanning optical microscopy and related imaging systems," Academic Press, San diego, 1996, pp. 31-45.

Török, P., et al., "High-numerical-aperture optical microscopy and modern applications: introduction to the feature issue," Applied Optics, 39(34), Dec. 1, 2000, pp. 6277-6278.

Kimura, S., et al., "Confocal scanning optical microscope using single-mode fiber for signal detection," Applied Optics, 30(16), Jun. 1, 1991, pp. 2143-2150.

Delaney, P.M., et al., "Fiber-optic laser scanning confocal microscope suitable for fluorescence imaging," Applied Optics, 33(4), Feb. 1, 1994, pp. 573-577.

Ilev, I.K., et al., "A simple submicron confocal microscope with a fiberoptic output," Rev. Sci. Instrum. 71(11), pp. 4161-4164, Nov. 2000.

Ilev, I.K., et al., "Submicron reflection confocal microscdope with a multimode fiber output," Conference on Lasers and Electro-Optics (CLEO-2000), San Francisco, CA, 2000, pp. 1-2.

* cited by examiner

ULTRAHIGH-RESOLUTION FIBER-OPTIC CONFOCAL MICROSCOPE AND METHOD

CROSS-REFERENCE TO RELATED APPLICATION

This application claims priority to U.S. Provisional Application No. 60/671,104, filed Apr. 14, 2005, and International Application No. PCT/US2006/014162, filed Apr. 14, 2006, the entire contents of which are incorporated herein by reference.

BACKGROUND

1. Field of Invention

The present invention relates to confocal microscopes and the use thereof, and more particularly to single-mode fiber-optic confocal microscopes.

2. Discussion of Related Art

High-resolution confocal laser microscopy is an emerging field in modern imaging and bioimaging technologies. This technique provides sharp, high-magnification, three-dimensional imaging with submicron resolution by non-invasive optical sectioning and rejection of out-of-focus information (see, T. Corle and G. Kino, "Confocal Scanning Optical Microscopy and Related Imaging Systems," Academic Press, San Diego, 1996; P. Torok and M. Gu, "High-numerical aperture optical microscopy and modern applications: introduction to the feature issue", Appl. Opt. 39, pp. 6277-6278, 2000; S. Kimura and T. Wilson, "Confocal scanning optical microscope using single-mode fiber for signal detection", Appl. Opt. 30, pp. 2143-2150, 1991; P. Delaney, M. Harris and R. King, "Fiber-optic laser scanning confocal microscope suitable for fluorescence imaging", Appl. Opt. 33, pp. 573-577, 1994). Depending on the fundamental principle of operation, the various confocal techniques are classified into three major groups: reflectance, fluorescence, and multi-photon confocal microscopes (see FIG. 1). The conventional confocal microscope has mainly been used in reflection mode, which is the operating principle as well of the ultrahigh-resolution confocal microscope approach of the present invention. While fluorescence and multi-photon confocal microscopy are based on a nonlinear conversion of the input laser wavelength, reflectance microscopy is linear, i.e., it is not related to any frequency conversion imaging technique, and thus it doesn't require special spectral filtering equipment. Three-dimensional reflectance imaging uses light reflected from a small, localized volume of an object, such as tissue, to form images. There are two main groups of reflectance confocal systems: pinhole-based and fiber-optic-based confocal microscopes (FIG. 1).

The conventional pinhole-based confocal microscope utilizes a bulk diffraction-limited optical design (see FIG. 2) in which both the light source (L) and the detector (D) usually take the form of micrometer-scale pinholes. The confocal principle involves the confocal microscope potential for both illumination of only one spot on the sample through the input pinhole (Ain) and imaging the radiation back reflected from the sample using a beam splitter (BS) to the output pinhole (Aout). In this way, the use of small pinholes reduces the amount of the scattered light and the signal-to-noise ratio increases by rejection of the out-of-focus signal. As a result, sharp high-magnification imaging of thick samples is obtained, which is one of the basic advantages of confocal microscopy over conventional optical microscopy. The optimum size and spacing of the pinhole depends on the focal length and numerical aperture of the confocal objectives (O).

A larger pinhole transmits more light to the detector (D), generating a larger signal but less resolution. A smaller pinhole has theoretically better resolution, but transmits less light to the sample, so the signal-to-noise ratio decreases. In addition, the high-numerical-aperture objectives (NA>0.8) in confocal microscope arrangements provide high depth and spatial discriminations and thus, high axial and lateral resolutions are obtained, respectively (see, T. Corle and G. Kino, "Confocal Scanning Optical Microscopy and Related Imaging Systems," Academic Press, San Diego, 1996). However, the bulk optical design with micrometer-sized pinholes that is usually used in conventional confocal systems has certain disadvantages related to unacceptable signal attenuation, diffraction and aberration effects, misalignment problems, inflexibility, and dust obstruction.

On the sub-wavelength nanometric scale, where there has been recently a great impetus to obtain quantitative chemical information at cellular and intracellular level, the optical imaging techniques have a major drawback related to their spatial resolution which results from the fundamental "Rayleigh diffraction resolution limit" that is theoretically one-half the wavelength of the operating radiation. In the case of confocal microscopy, the diffraction limit affects the out-of-focus light. A pinhole-based confocal microscope attempts to remove this light with a confocal pinhole aperture, but such an aperture would need to have a diameter close to zero to eliminate the out-of-focus contribution. An effective way to avoid the resolution limit and to work far beyond it is a fiber-optic-based confocal microscope approach as with the ultrahigh-resolution confocal microscope and methods of the current invention.

To improve the dynamic range of the resolving laser power and to achieve a high spatial resolution in the nanometric spatial range, recently the current inventors have suggested a novel design of a simple reflection-type confocal microscope with a single optical fiber output (see, Iev and R. Waynant, "A simple submicron confocal microscope with a fiber-optic output", Rev. Sci. Instrum. 71, pp. 4161-4164, 2000; 1. Ilev and R. Waynant, "Submicron reflection confocal microscope with a multimode fiber output", Conference on Lasers and Electro-Optics (CLEO-2000), Paper CThM77, San Francisco, 2000; 1. Ilev, R. Waynant, K. Byrnes and J. Anders, "Dual-confocal fiber-optic method for absolute measurement of refractive index and thickness of optically transparent media", Opt. Lett. 27, pp. 1693-1695, 2002; the entire contents of which are hereby incorporated by reference). An experimental optical setup of this fiber-optic confocal design is shown in FIG. 3. It is an apertureless confocal arrangement having a pair of objective lenses (O1 and O2) and a beam splitter (BS), in which the micrometer-sized pinholes are replaced by a highly sensitive optical fiber. The laser emission is launched directly, without input pinhole, to the scanned object. In this way, all possible negative effects leading to signal attenuation such as reduction of the input laser power, need of additional collimation, diffraction and aberration effects are eliminated, and a regime of maximum input signal level is ensured. Moreover, the confocal design includes a graded-index 50.mu.m core diameter multimode fiber used for signal detection rather than a conventional pinhole. Because of much lower numerical aperture of the optical fiber than that of a conventional pinhole, the multimode fiber-optic output shows much higher sensitivity to spatial displacements of the focusing back reflected radiation than a pinhole.

BRIEF SUMMARY

An object of the current invention is to provide an improved confocal microscope and improved methods of confocal microscopy.

An ultrahigh-resolution fiber-optic confocal microscope according to an embodiment of the invention comprises an illumination system; a first single-mode optical fiber arranged with an end adapted to be optically coupled to said illumination system to receive illumination radiation from said illumination system; a fiber coupler adapted to be optically coupled to a second end of said first single-mode optical fiber; a second single-mode optical fiber having an end adapted to be optically coupled to said fiber coupler; a sample support stage arranged to receive illumination radiation from a second end of said second single-mode optical fiber; a third single-mode optical fiber having an end adapted to be optically coupled to said fiber coupler; a detector arranged to receive output radiation from a second end of said third single-mode optical fiber; and a lock-in amplifier electrically connected to said detector and said illumination system, wherein said illumination system is adapted to provide illumination radiation that has a time-varying strength that is correlated with said detector by said lock-in amplifier.

A differential confocal microscope according to an embodiment of the invention comprises an illumination system; a first single-mode optical fiber arranged with an end adapted to be optically coupled to the illumination system to receive illumination radiation from the illumination system; a fiber coupler adapted to be optically coupled to a second end of the first single-mode optical fiber; a second single-mode optical fiber having an end adapted to be optically coupled to the fiber coupler; a sample support stage arranged to receive illumination radiation from a second end of the second single-mode optical fiber; a stage assembly operatively coupled to the sample support stage, the stage assembly being structured to move the support stage by incremental steps in a direction toward and away from the second end of the second single-mode optical fiber; a third single-mode optical fiber having an end adapted to be optically coupled to the fiber coupler; a detector arranged to receive output radiation from a second end of the third single-mode optical fiber; and a computer in communication with the detector and the stage assembly, wherein the computer is programmed to move the sample support stage to a position along the direction of motion of the sample support stage toward and away from the second end of the second single-mode optical fiber so that observation will be made away from a diffraction-limited region of optical response of the differential confocal microscope.

A microscopy method according to the current invention comprises generating a time-varying beam of illumination radiation; coupling said time-varying beam of illumination radiation into an single-mode fiber-optic assembly; illuminating a sample under observation with light emitted from an end of said single-mode fiber-optic assembly; receiving reflected light from said sample under observation by said end of said single-mode fiber-optic assembly; directing reflected light, substantially free from illumination light, to an optical detector; and detecting said reflected light by said detector using lock-in amplification correlated with the time-varying beam of illumination radiation.

DETAILED DESCRIPTION OF THE INVENTION

Figure 1:
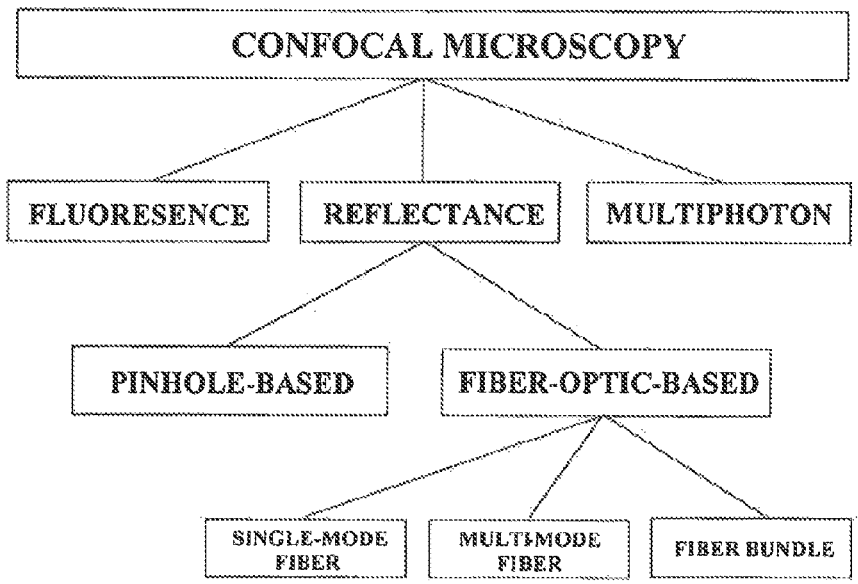
FIG. 1 is a schematic illustration of types of confocal microcopy.
Figure 2:
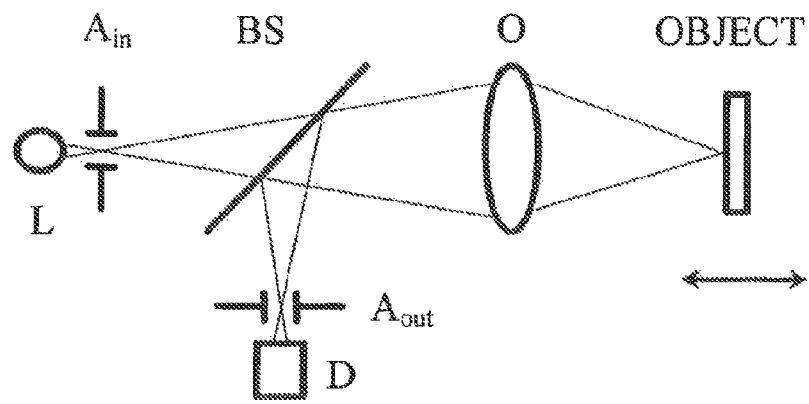
FIG. 2 is a schematic illustration of a conventional pinhole-based confocal microscope.
Figure 3:
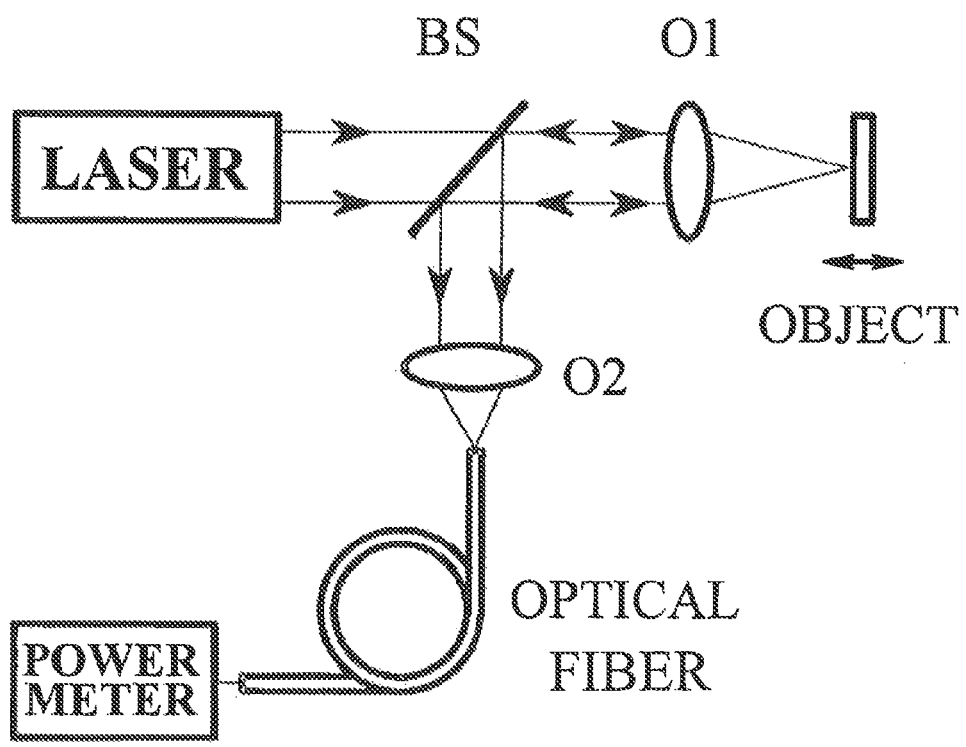
FIG. 3 is a schematic illustration of a conventional confocal microscope having a multi-mode optical fiber along the signal detection leg.
Figure 4:
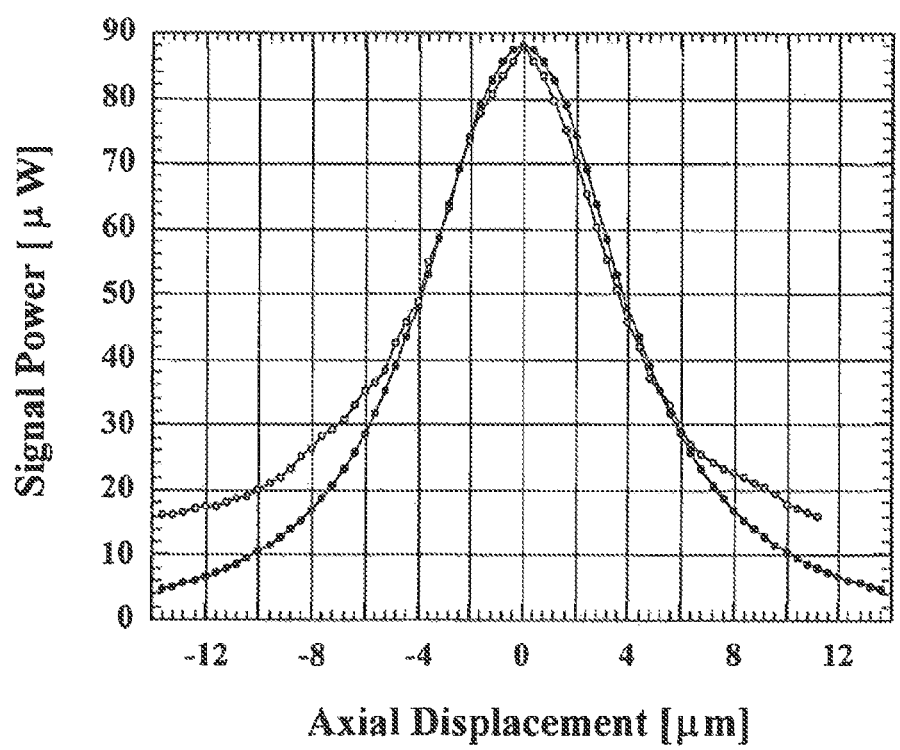
FIG. 4 shows typical fiber-optic-based confocal response curves for experimental and theoretical cases.

The fiber-optic-based confocal technique offers a number of possible advantages over the pinhole technique in terms of spatial resolution, flexibility, miniaturization and scanning possibilities. A typical fiber-optic-based confocal response measured at discrete axial movements of a diffuse, non-absorbing target with a minimal step of 400 nm is shown in FIG. 4. Both experimental (open circles) and theoretical (filled circles) curves demonstrate the system potential for a submicron axial resolution of 400 nm, because the level of the useful registered signals at the dependence maximum is higher than that of the signal fluctuations observed. However, the maximum axial resolution of this confocal technique is still limited by the optical diffraction barrier that can be overcome using additional ultrahigh-resolution confocal techniques described below.

The diffraction resolution limit of optics has been one of the main driving forces leading to development of new high-resolution imaging tools to probe cellular structures and functions at sub-wavelength nanometric scale. Originally, breaking the diffraction barrier in optical bioimaging was demonstrated using near-field scanning optical microscopy (see, E. Betzig and R. Chichester, "Single molecules observed by near-field scanning optical microscopy", Science 262, pp. 1422-1425, 1993; A. Lewis, A. Radko, N. Ami, D. Palanker and K. Lieberman, "Near-field scanning optical microscopy in cell biology", Trends in Cell Biology 9, pp. 70-73, 1999). In this method, a tapered glass near-field probe used as a light source or detector with sub-wavelength dimensions is placed in close proximity ($<\lambda/50$) to a sample to generate images with resolution better than that of the diffraction limit. Recently, a confocal microscope approach has also been explored for bioimaging in the nanometric range (see, C. Lee and J. Wang, "Noninterferometric differential confocal microscopy with 2-nm depth resolution", Opt. Commun. 135, pp. 233-237, 1997; C. Lee, C. Guo and J. Wang, "Optical measurement of viscoelastic and biochemical responses of living cells to mechanical perturbation", Opt. Lett. 23, pp. 307-309, 1998). The method is called differential confocal microscopy (DCM). It is a pinhole-based reflectance confocal microscope that includes the use of the sharp slope of the axial confocal response curve rather the area around the maximum of that curve. The DCM principle of operation can also be combined with the fiber-optic-based confocal microscope disclosed herein.

Figure 5:
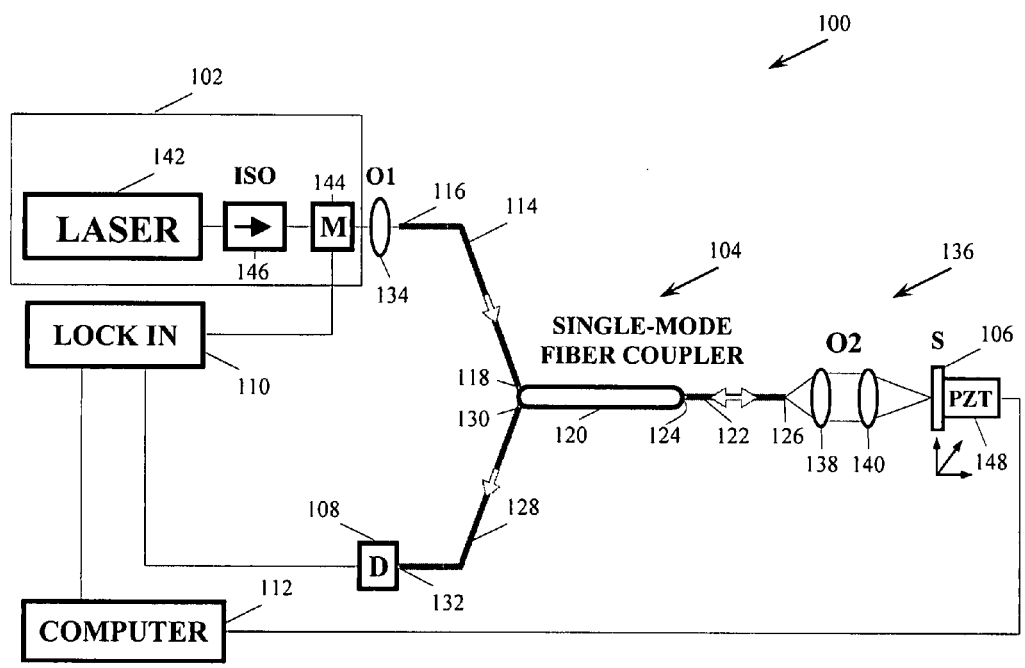
FIG. 5 is a schematic illustration of an ultrahigh-resolution confocal microscope according to an embodiment of the current invention.

An embodiment of an ultrahigh-resolution fiber-optic confocal microscope, and the operating principle, according to the present invention are illustrated in FIG. 5. This is a simple apertureless reflection confocal microscope with a highly sensitive single-mode fiber confocal output.

FIG. 5 is a schematic illustration of an embodiment of the ultrahigh-resolution fiber-optic confocal microscope according to an embodiment of this invention. The ultrahigh-resolution fiber-optic confocal microscope 100 has an illumination system 102 optically coupled to a fiber-optic assembly 104, a sample support stage 106, a detector 108, and a lock-in amplifier 110. A computer 112 may also be included in the system if some or all of the observation functions are automated. The optical fiber assembly 104 has a first single-mode optical fiber 114 which has an end 116 optically coupled to the illumination system 102. The single-mode optical fiber 114 has another end 118 optically coupled to fiber coupler 120. A second single-mode optical fiber 122 has an end 124 optically coupled to the fiber coupler 120. The single-mode optical fiber 122 has another end 126 which is arranged relative to the sample support stage 106 to illuminate a sample under observation and to receive reflected light from the sample. A third single-mode optical fiber 128 has an end 130 optically coupled to the fiber coupler 120. The third single-mode optical fiber 128 has another end 132 through which light travels and is detected by the detector 108.

For good results, the detector can be a high-sensitivity broadband detector. However, the invention is not limited to only such a detector. For the case of an illumination wavelength of 632.8 nm, a detector having a spectral range of 300-1800 nm was found to be suitable.

The fiber coupler 120 is a 2×1 single-mode fiber coupler. In this embodiment, good results have been obtained using a 50/50 single-mode fiber coupler. However, this invention is not limited to only 50/50 single-mode fiber couplers. One may use single-mode fiber couplers with splitting ratios different from 50/50 without departing from the general concept of this invention. Single-mode fiber couplers having a maximum insertion loss of ≦3 dB have been found to be suitable for use in the ultrahigh-resolution fiber-optic confocal microscope 100. In addition, one selects the single-mode coupler 120 in accordance with the wavelength of light from the illumination system 102.

The single-mode optical fibers 114, 122, and 128 support a single-mode of transmission of light at the wavelength of the illumination system 102. In this embodiment, the single-mode optical fibers 114, 122 and 128 were selected to have core diameters and refractive index profiles such that they produce an output beam having a Gaussian intensity distribution in which the center of the beam is brightest and the intensity drops off exponentially towards the edges of the beam.

For ultrahigh-resolution applications, one should select single-mode optical fibers that have a small micrometric fiber core dimension. Small core dimensions in the range of 3-8 µm have been found to be suitable. Good results have been obtained with fibers having 3 µm cores.

An input microscope objective 134 is disposed between the illumination system 102 and the end 116 of the single-mode optical fiber 114. A high-numerical-aperture confocal microscope objective 136 is arranged between the sample support stage 106 and the end 126 of single-mode optical fiber 122. The input microscope objective 134 and high-numerical-aperture confocal microscope objective 136 are illustrated schematically in FIG. 5. Each schematic lens may be a single lens or could be a compound lens or a plurality of lens components. The high-numerical-aperture confocal microscope objective 136 has a collimating objective 138 and a focusing objective 140. The collimating 138 and focusing 140 objectives may be selected having various magnifications such as in the range of 4× to 100×. The collimating objective 138 is infinity corrected. In high-resolution embodiments, one should elect the focusing objective 140 to have a numerical aperture (NA) of at least 0.5 (NA≧0.5). For ultrahigh-resolution application, one should select a high-numerical-aperture of at least 0.8. Good results were obtained in this embodiment using a focusing objective 140 with a numerical aperture of 0.85.

The illumination system 102 has a laser 142 and a modulator 144 disposed to intercept the beam from the laser 142. An isolator (ISO) 146 is arranged between the laser 142 and modulator 144. In this embodiment, the laser 142 is selected from continuous-wave lasers that are intensity stabilized with an RMS output power fluctuation less than .+−.0.1%. One may select the laser to have a wavelength according to the desired application. For example, lasers may be selected to have output beams in a variety of ultraviolet, visible and infrared spectral ranges. In this embodiment, the laser 142 has a low output power of between 10 to 30 milliwatts.

The modulator 144 may be selected from a wide range of available modulators. For example, a suitable modulator 144 is a chopper comprising a rotating disk that intercepts the beam from laser 142. The disk rotates such that alternating light transmitting and light blocking portions of the disk intercept the beam. A chopper which has a disk of about 4 inches in diameter that rotates at about 300 cycles-per-second was found to be suitable for the ultrahigh-resolution fiber-optic confocal microscope 100 according to this embodiment of the invention. However, the invention is not limited to only a chopper as the modulator and is not limited to any particular frequency. Any frequency will provide some improvement in signal-to-noise ratio. A frequency in the hundreds of cycles-per-second, for example, provides better signal-to-noise ratios that a frequency of tens of cycles-per-second. This arrangement allows the illumination system 102 to provide a time varying illumination beam which varies in intensity over time. The time variation of the illumination beam is correlated with the detector 108 by lock-in amplifier 110. Other types of non-mechanical modulators, other than choppers, may also be used such as acousto-optic modulators or electro-optic modulators.

In addition, instead of placing modulator 144 in the path of the beam from the laser 142, which is called an external modulator, one may also directly modulate the laser 142. An example of direct modulation of the laser is varying the power to the laser. In this case, the lock-in amplifier 110 is electrically connected to the laser 142.

The isolator 146 allows illumination light from the laser 142 to pass through in the direction of the single-mode optical fiber 114, but prevents light of the same wavelength from traveling in the opposite direction from the fiber 114 to the laser 142. Isolators having transmission efficiency greater than 95% and isolation less than 20 dB have been found to be suitable for this embodiment of the present invention.

The ultrahigh-resolution fiber-optic confocal microscope 100 according to the current invention may also include a stage assembly 148 to move the sample support stage 106 in a desired direction. The stage assembly 148 may move the sample support stage 106 in one, two or three linear directions. For example, the stage assembly 148 may move sample support stage 106 in a straight line towards the objective 136 and/or away from the objective 136. For applications in which three-dimensional imaging is desired, the stage assembly 148 moves the sample support stage 106 in two linear directions orthogonal to the direction toward and away from the objective 136, and orthogonal to each other (i.e., X-Y-Z motion). For ultrahigh-resolution observations, one may select a stage assembly that has high-precision, calibrated piezoelectric transducers for calibrated motion in any one, any two, or all of the X, Y and Z orthogonal directions. For example, one may select piezoelectric calibrated multi-access transducers with minimal spatial increments of about 50 nanometers or less. An example of a suitable stage assembly for high precision operation of the ultrahigh-resolution fiber-optic confocal microscope 100 is the compact long-range piezo nano translation stages model-P-621.1 CD provided by POLYTEC PI, having minimum spatial resolution of 0.2 nm. However, the invention is not limited to the use of specific stage assemblies.

In operation, laser 142 produces a continuous-wave beam of illumination light at a desired wavelength which passes through the isolator 146 and is modulated by a modulator (M) 144 to provide a time varying beam of illumination light output from the illumination system 102. The illumination beam output from illumination system 102 is focused by input microscope objective 134 onto the single-mode optical fiber 114 to couple the beam into the end 116 of the single-mode optical fiber 114. The beam of illumination light travels from single-mode optical fiber 114 through fiber coupler 120 to the single-mode optical fiber 122. The ultrahigh-resolution fiber-optic confocal microscope objective 136 collects and collimates light output from the end 126 from the single-mode optical fiber 122 and focuses it onto a sample held on sample support stage 106. Light reflected from the sample held by the sample support stage 106 passes back through the high-numerical-aperture confocal microscope objective 136, back into the same end 126 of the single-mode optical fiber 122. The end 126 of the optical fiber 122 thus acts as substantially a point source for illumination radiation as well as a point receiver. As a receiver, the end 126 thus achieve a high degree of spatial filtering by not coupling to much of the light coming from points away from the observation point. Furthermore, the output and received beams at the end 126 of the single-mode optical fiber 122 are substantially Gaussian profile beams. The light reflected from the sample held on the sample support stage 106 travels back through the single-mode optical fiber 122 and is directed to the single-mode optical fiber 128 by the fiber coupler 120. The reflected light from the sample is then directed onto the detector 108 through the end 132 of the single-mode optical fiber 128. The detector 108 detects reflected light from the sample at a frequency which is matched to the modulation frequency of the modulator 144 by the lock-in amplifier 110. With the intensity stabilized laser 142 and lock-in amplifier 110 as described in this example, signal fluctuations that did not exceed in total 0.2% were obtained.

Figure 6:
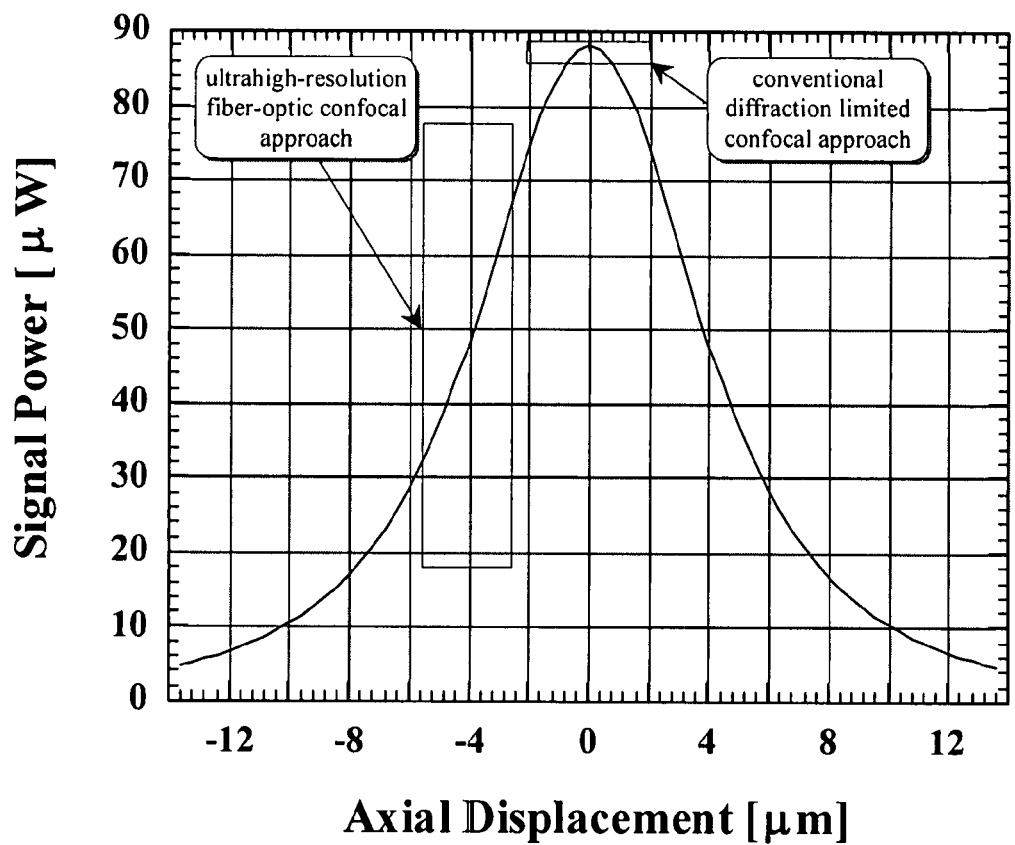
FIG. 6 illustrates diffraction limited and differential confocal microscope approaches for a confocal microscope according to the current invention.
Figure 7:
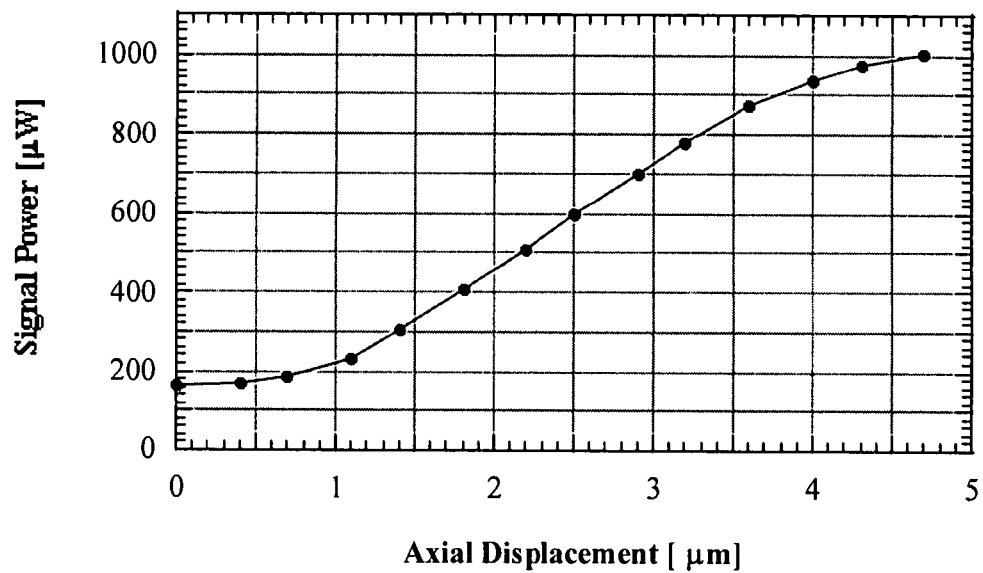
FIG. 7 shows data obtained for a confocal microscope response curve for the confocal microscope illustrated in FIG. 5.
Figure 8:
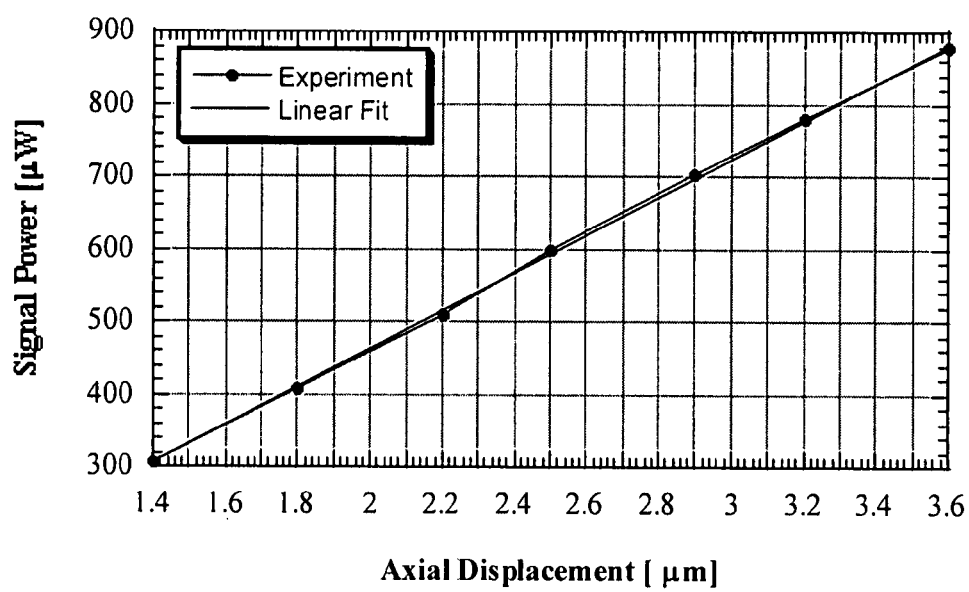
FIG. 8 is a portion of the confocal microscope response curve of FIG. 7 that is appropriate for differential confocal microscopy.

The ultrahigh-resolution fiber-optic confocal microscope 100 according to this embodiment of the invention may also provide an ultrahigh-resolution differential confocal microscope. FIG. 6 shows a typical confocal response curve obtained using a fiber-optic confocal setup. In this case, to apply the DCM approach one places the sample slightly away from the focal point area, away from the curve maximum corresponding to a conventional confocal approach so that its position is at the sharp diffraction-free slope of the axial response curve (beyond the diffraction barrier). In this way, the dynamic range and spatial sensitivity are increased significantly because the signal light that enters into the detecting fiber depends sensitively on the sample position. As a result, one can get an ultrahigh spatial resolution of the fiber-optic confocal microscope to perform imaging beyond the diffraction limit, in the nanometric range. As an example, FIG. 7 illustrates an experimental axially scanned confocal response obtained using an example of the above-described embodiment of a ultrahigh-resolution confocal microscope 100 when the DCM approach is applied i.e. the sample is placed at the slope of the curve. In this case, the graphic dependence demonstrates the confocal system potential for a sub-wavelength axial resolution (beyond the diffraction barrier) because the level of the registered signals is much higher than that of signal fluctuations observed. FIG. 8 is an enlarged and truncated view of the data shown in FIG. 7 for the region of sharp diffraction-free slope appropriate for the DCM approach. A straight line is fit to the data shown in FIG. 8. In one approach, one may select a point about at the center of the diffraction-free slope region shown in FIG. 8 to perform the imaging. However, the invention is not limited to only the DCM approach and is not limited to only selecting a point about at the center of the diffraction-free slope region.

One may manually operate the ultrahigh-resolution fiber-optic confocal microscope 100 as a differential confocal microscope, or the ultrahigh-resolution fiber-optic confocal microscope 100 may include a computer 112 programmed to effect differential microscopy such that the ultrahigh-resolution fiber-optic confocal microscope 100 comprising the programmed computer 112 is a differential confocal microscope. In this case, the computer 112 is programmed to communicate with the stage assembly 148 and the lock-in amplifier 110 so that the sample support stage 106 is moved to a preselected position along the linear portion of the axial response curve. The stage assembly 148 may then be operated along the X and Y directions, if desired, to produce a two-dimensional scanned image by the differential observation technique. Axial resolutions beyond the diffraction barrier in the sub-wavelength range below about 200 nanometers can then be obtained.

Figure 9:
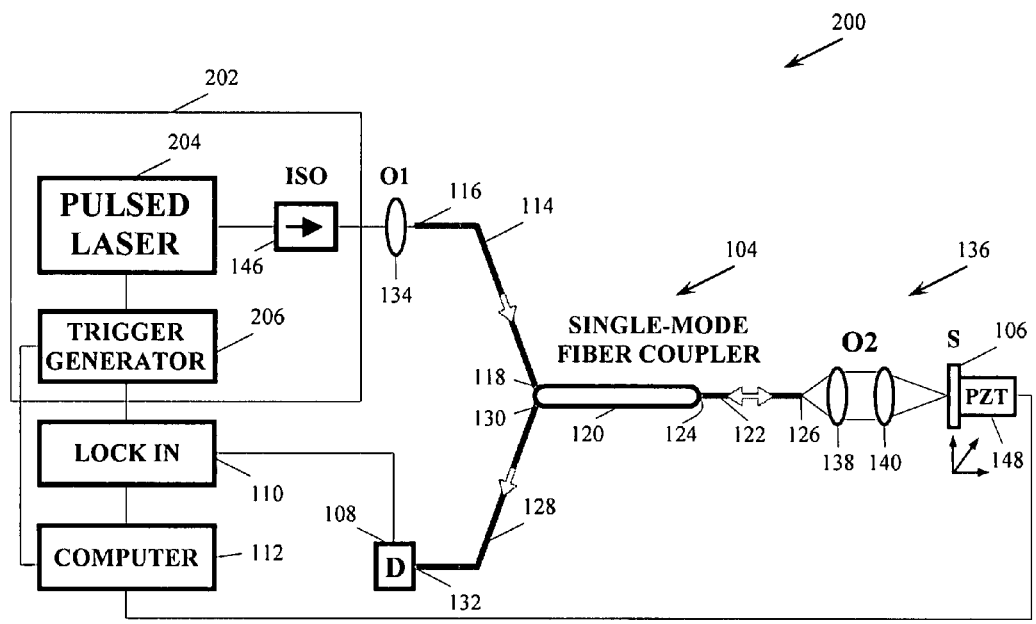
FIG. 9 is another embodiment of an ultrahigh-resolution confocal microscope according to the current invention.

FIG. 9 is a schematic illustration of another embodiment of an ultrahigh-resolution fiber-optic confocal microscope 200 according to the current invention. Components that have the same reference numerals as in FIG. 5 correspond to the same components as described in reference to FIG. 5. In this embodiment, the illumination system 202 has a pulsed laser 204 instead of a continuous-wave laser as used in the embodiment of FIG. 5. The trigger generator 206 causes the pulsed laser 204 to emit a laser pulse. The pulse repetition frequency from the illumination system 202 is matched to the detector (D) 108 by lock-in amplifier 110. The ultrahigh-resolution fiber-optic confocal microscope 200 operates in a manner similar to that described in the embodiment of FIG. 5. Illumination light from the illumination system 202 is coupled into the end 116 of the single-mode optical fiber 114 through the input microscope objective (O1) 134 and passes through the single-mode optical fiber 122 to illuminate a sample held on the sample support stage (S) 106 through the high-numerical-aperture confocal microscope objective (O2) 136. Light reflected from a sample held on the sample support stage 106 returns through the high-numerical-aperture confocal microscope objective (O2) 136, is coupled into the optical fiber 122 through the end 126 and travels back through the fiber coupler to the single-mode optical fiber 128 to be detected by detector 108. Similarly, computer 112 can be provided and programmed to allow the ultrahigh-resolution fiber-optic confocal microscope 200 to operate as a differential confocal.

Figure 10:
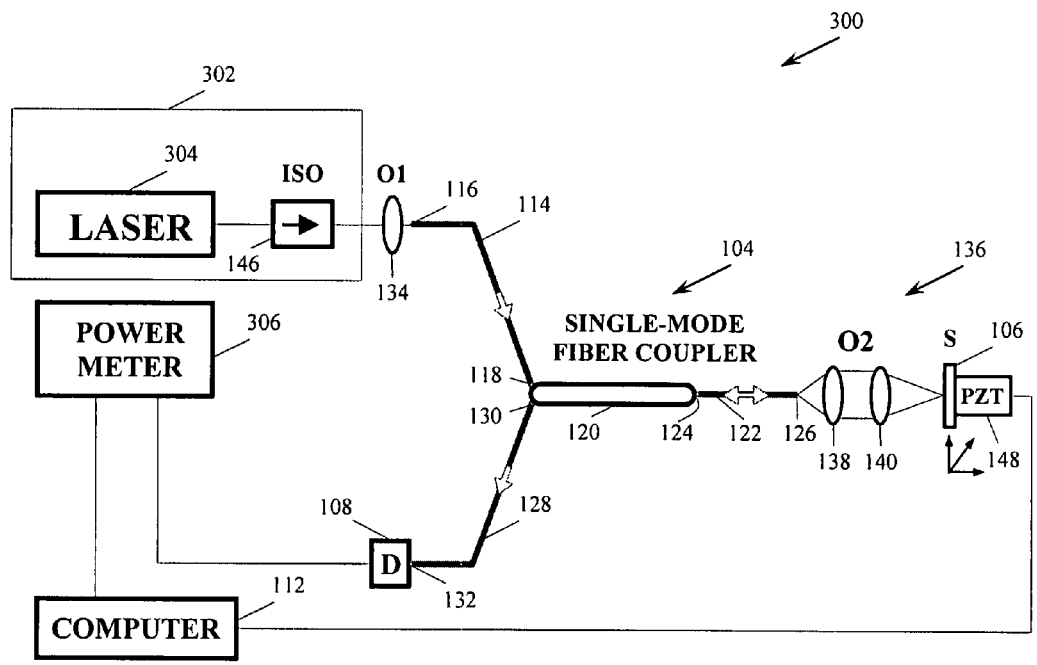
FIG. 10 is yet another embodiment of an ultrahigh-resolution confocal microscope according to the current invention.

FIG. 10 is a schematic illustration of another embodiment of an ultrahigh-resolution fiber-optic confocal microscope 300 according to this invention. Like reference numerals in FIG. 10 correspond to the components previously described in the embodiments of FIGS. 5 and 9. In this embodiment, the illumination system 302 has a laser 304. The laser 304 may be selected from stabilized lasers as previously discussed. In this case, there is no modulator disposed between the laser 304 and the input microscope objective 134. In addition, there is no lock-in amplifier 110. The ultrahigh-resolution fiber-optic confocal microscope 300 according to this embodiment of the invention has a power meter 306 to determine the signal power. As with the previous embodiments, a computer 112 may be included in this embodiment of the invention to automate various functions. Similarly, the computer 112 may also be programmed so that the ultrahigh-resolution fiber-optic confocal microscope 300 according to this embodiment of the invention operates as a differential confocal microscope.

Figure 11:
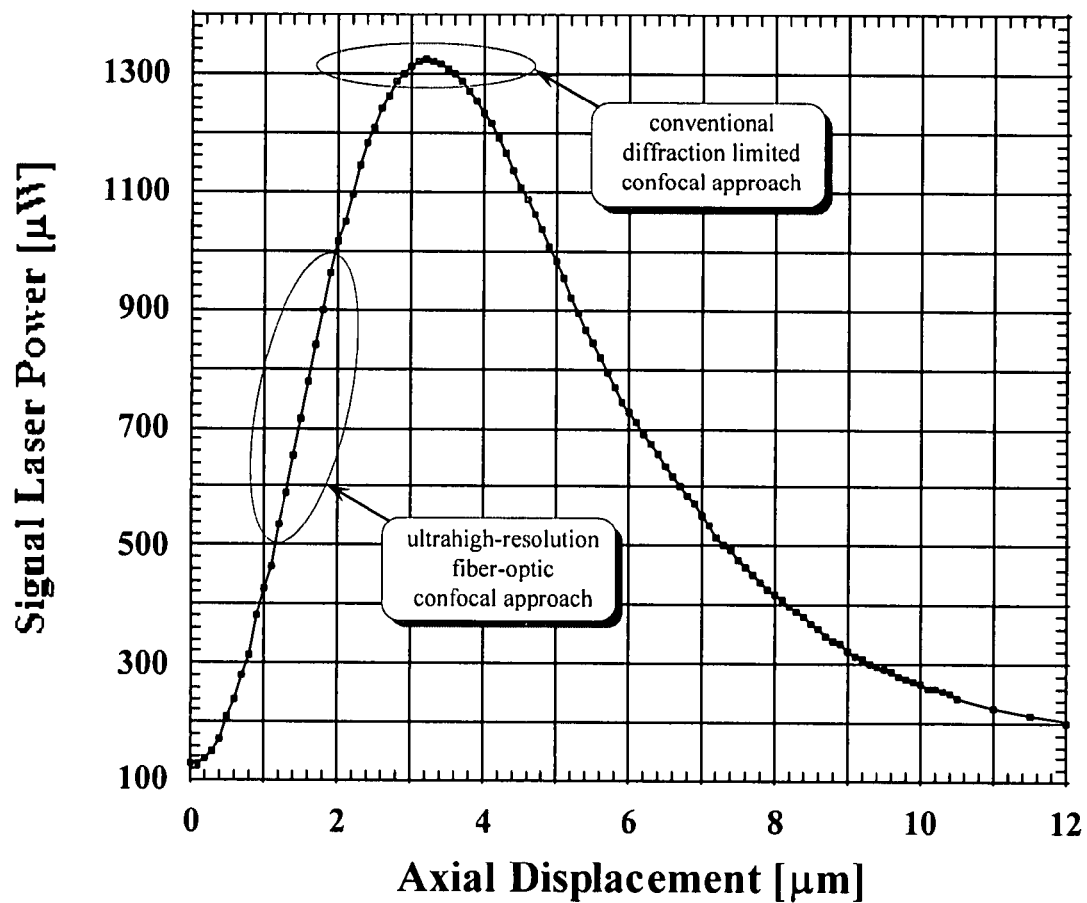
FIG. 11 shows data obtained for a confocal microscope response curve for the confocal microscope illustrated in FIG. 10.
Figure 12:
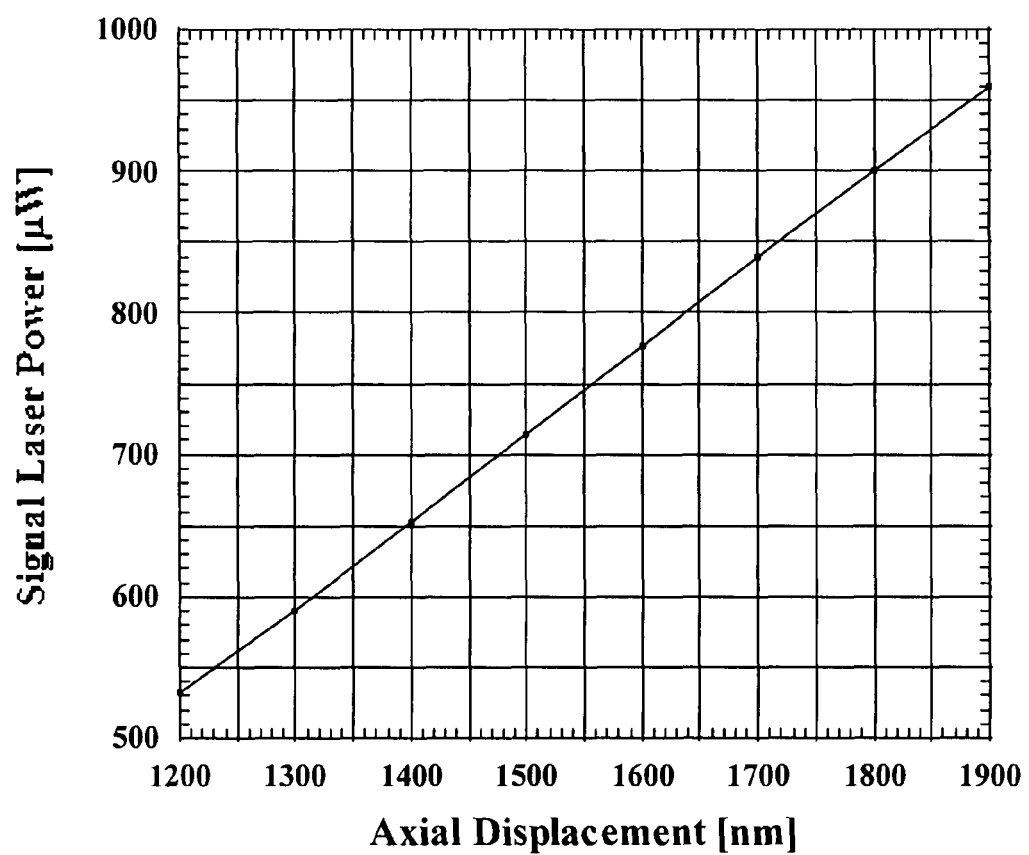
FIG. 12 shows data obtained for a confocal microscope response for the confocal microscope illustrated in FIG. 10 having a 100 nm depth resolution.
Figure 13:
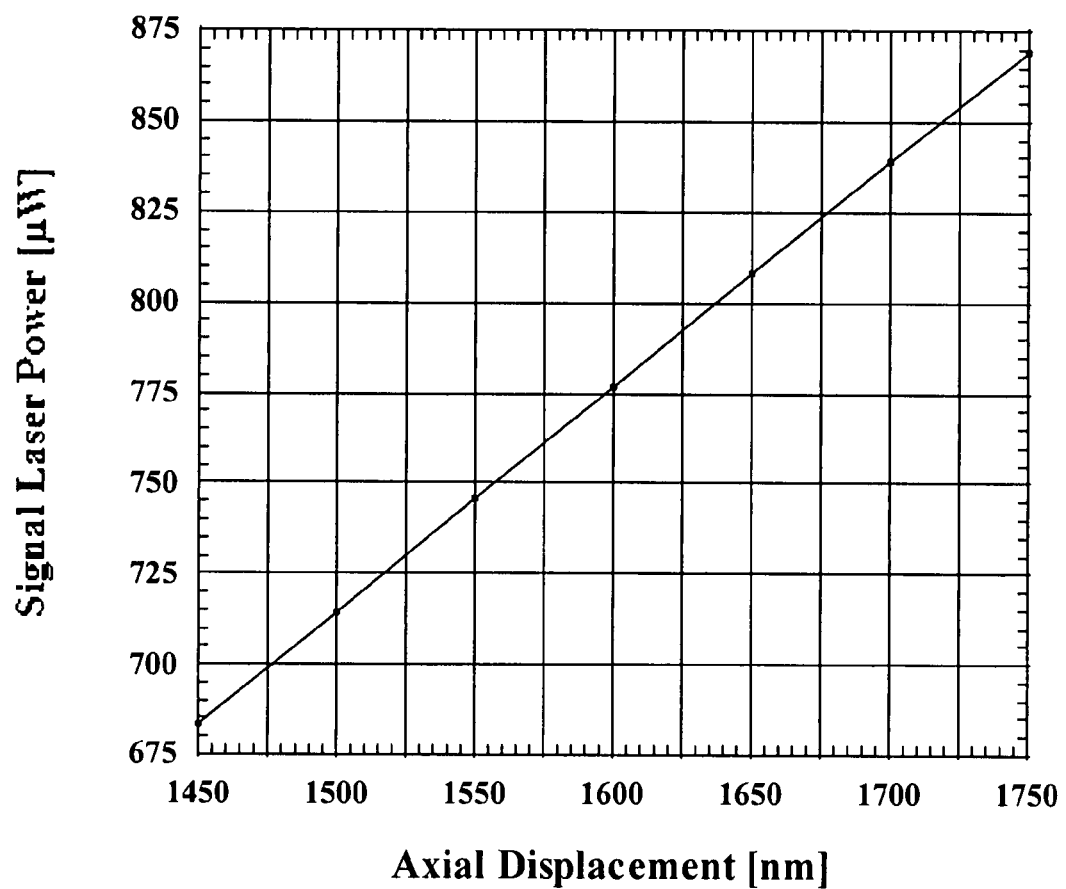
FIG. 13 shows data obtained for a confocal microscope response for the confocal microscope illustrated in FIG. 10 having a 50 nm depth resolution.
Figure 14:
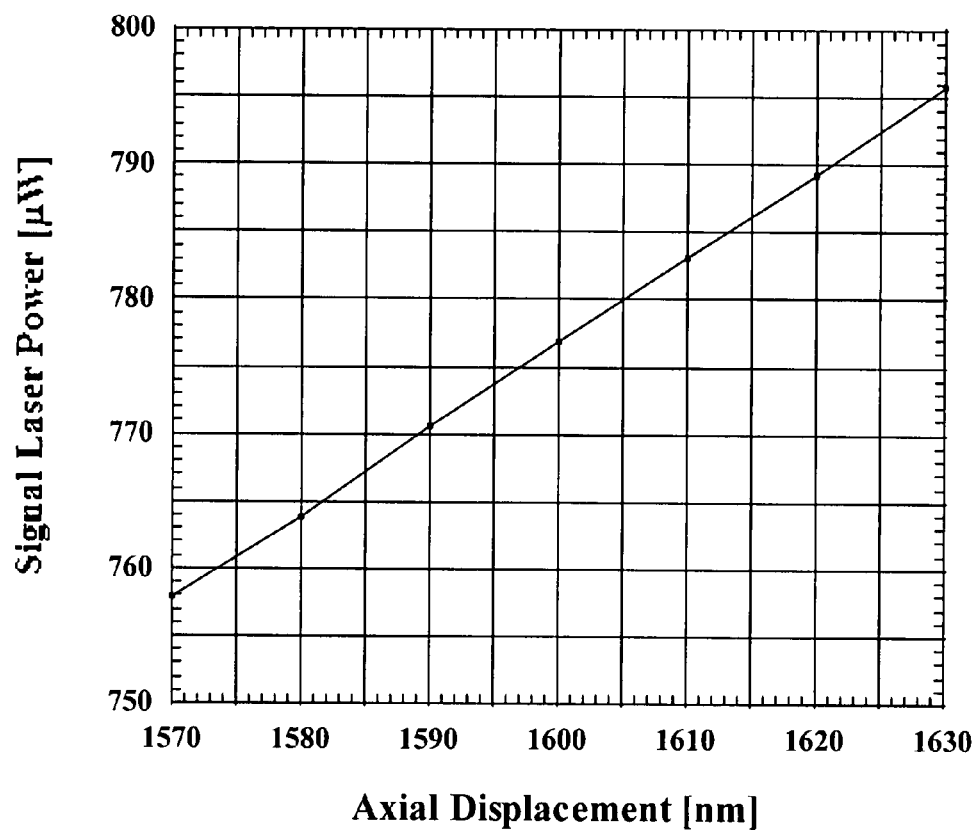
FIG. 14 shows data obtained for a confocal microscope response for the confocal microscope illustrated in FIG. 10 having a 10 nm depth resolution.
Figure 15:
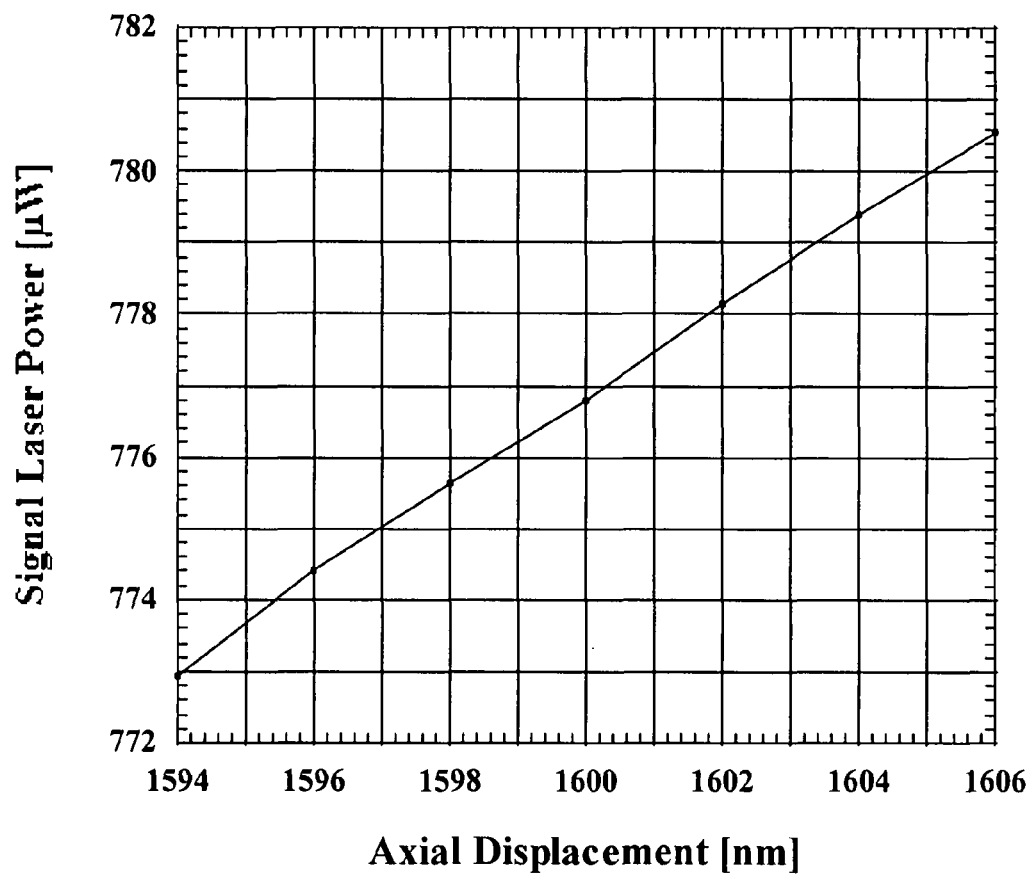
FIG. 15 shows data obtained for a confocal microscope response for the confocal microscope illustrated in FIG. 10 having a 2 nm depth resolution.

FIG. 11 shows a typical confocal response curve obtained using a fiber-optic confocal setup according to the embodiment illustrated in FIG. 10. In this case, we placed the sample slightly away from the focal point area to apply the DCM approach, i.e., away from the maximum of the curve, so that its position is at the sharp diffraction-free slope of the axial response curve beyond the diffraction barrier (the area marked as DCM approach). In this way, the dynamic range and spatial sensitivity are increased significantly because the signal light that enters into the detecting fiber depends sensitively on the sample position. As a result, we can get an ultrahigh spatial resolution of the fiber-optic confocal microscope and obtain imaging beyond the diffraction limit in the nanometric range. As examples, FIGS. 12-15 illustrate experimental axially scanned confocal responses obtained using a fiber-optic confocal microscope according to this invention when the DCM approach is applied. In this case, the graphic dependence demonstrates the confocal system potential for a subwavelength axial resolution beyond the diffraction barrier because the level of the registered signals is much higher than that of signal fluctuations observed.

This example of a fiber-optic confocal microscope according to this embodiment of the invention employs tools and detecting techniques that possess high signal-to-noise potential such as intensity stabilized laser source, a high-sensitive lock-in-amplifier detecting system and a spatial scanning stage with nanometric resolution.

Thus, combining these unique advanced features of the ultrahigh-resolution fiber-optic confocal microscope according to the current invention, we can work beyond the diffraction barrier in the subwavelength nanometric range below 200 nm. One can thus exploit confocal bioimaging of samples, for example, with dimensions in nanometric range. FIGS. 12-15 plot experimental confocal responses obtained using the ultrahigh-resolution fiber-optic confocal microscope illustrated in FIG. 10 when various sample axial displacements in the range of 2-100 nm are used. These results confirm the potential of the fiber-optic confocal microscope of the current invention for achieving a subwavelength depth resolution of 100 nm (FIG. 12), 50 nm (FIG. 13), 10 nm (FIG. 14), and 2 nm (FIG. 15), respectively.

The axial resolution of the presented fiber-optic confocal microscope depends basically on several factors including signal power variations, NA of focusing confocal objectives, fiber core diameter, and minimal scanning increment of the transducers used. In the experimental conditions of the ultrahigh-resolution fiber-optic confocal microscope of the current example which includes the use of high-NA (>0.8) confocal microscope objectives, small core diameter single-mode fibers with a minimal core diameter of 3-5 µm, and a piezoelectric transducers with a minimal axial step smaller than 1 nm, the basic factor that determines the axial resolution remains the signal power fluctuations. These fluctuations can be caused by fluctuations of the laser power or in the registering apparatus. In this example of a confocal microscope according to the current invention, we minimized the influence of this factor by using an intensity stabilized laser and a lock-in-amplifier based detecting system. In this way, the signal fluctuations do not exceed in total 0.2%. Thus, the proposed fiber-optic confocal microscopy combined with the DCM approach provides an ultrahigh axial resolution beyond the diffraction barrier in the subwavelength nanometric range below 200 nm.

The above is a description of the current invention with reference to exemplary embodiments of the invention. One with ordinary skill in the art would readily recognize that various modifications could be made and alternatives to the exemplary embodiments could be used without departing from the scope and spirit of this invention. All such modifications and alternatives are intended to be included in this invention as defined by the claims.

We claim:

1. A differential fiber-optic confocal microscope, comprising:
    an illumination system;
    a first single-mode optical fiber arranged with an end adapted to be optically coupled to said illumination system to receive illumination radiation from said illumination system;
    a fiber coupler adapted to be optically coupled to a second end of said first single-mode optical fiber;
    a second single-mode optical fiber having an end adapted to be optically coupled to said fiber coupler;
    a sample support stage arranged to receive illumination radiation from a second end of said second single-mode optical fiber;
    a stage assembly operatively coupled to said sample support stage, said stage assembly being structured to move said support stage by incremental steps in three different linear directions toward and away from said second end of said second single-mode optical fiber;
    a third single-mode optical fiber having an end adapted to be optically coupled to said fiber coupler;
    a detector arranged to receive output radiation from a second end of said third single-mode optical fiber, the output radiation having a detected frequency;
    a lock-in amplifier electrically connected to said detector and said illumination system to correlate a time-varying strength of the illumination system with the detector by matching a frequency of the illumination radiation with the detected frequency; and
    a computer in communication with said lock-in amplifier, and said stage assembly,
    wherein said computer is programmed to move said sample support stage to a position along the at least one of said three different linear directions of motion of said sample support stage toward and away from said second end of said second single-mode optical fiber so that observation will be made outside a diffraction-limited region of optical response of said differential confocal microscope.

2. A differential fiber-optic confocal microscope according to claim 1, wherein said position along said direction of motion of said sample support stage toward and away from said second end of said second single-mode optical fiber is a position of large change in intensity of illumination light for changes in said position compared to changes in intensity of illumination light with respect to changes of said position when said position is within said diffraction limited region of said optical response of said differential confocal microscope.

3. A differential fiber-optic confocal microscope according to claim 1, wherein said position along said direction of motion of said sample support stage toward and away from said second end of said second single-mode optical fiber is a position of substantially maximum change in intensity of illumination light for changes in said position.

4. The differential fiber-optic confocal microscope according to claim 1, wherein said fiber coupler is a Y-type fused-fiber fiber coupler.

5. The differential fiber-optic confocal microscope according to claim 1, wherein said fiber coupler allows about half of said light reflected from said sample to pass from said second single-mode optical fiber to said third single-mode optical fiber.

6. The differential fiber-optic confocal microscope according to claim 1, further comprising a microscope objective disposed between said second end of said second single-mode optical fiber and said sample support stage.

7. The differential fiber-optic confocal microscope according to claim 6, wherein said microscope objective has a numerical aperture of at least 0.5.

8. The differential fiber-optic confocal microscope according to claim 6, further comprising an input microscope objective disposed between the first-mentioned end of the first single-mode optical fiber and said illumination system.

9. The differential fiber-optic confocal microscope according to claim 1, wherein said stage assembly comprises a piezoelectric transducer adapted to move said support stage by incremental steps toward and away from said second end of said second single-mode optical fiber.

10. The differential fiber-optic confocal microscope according to claim 1, wherein said stage assembly is constructed to move said sample support stage in a second direction that is orthogonal to the first-mentioned direction and in a third direction that is orthogonal to the first-mentioned and second directions.

11. The differential fiber-optic confocal microscope according to claim 10, wherein said stage assembly comprises a three-axis piezoelectric transducer assembly.

12. The differential fiber-optic confocal microscope according to claim 1, wherein said first, second and third single-mode optical fibers each have a core diameter and a refractive index cross-sectional profile that provides a substantially Gaussian cross-sectional intensity profile of transmitted light.

13. The differential fiber-optic confocal microscope according to claim 12, wherein said first, second and third single-mode optical fibers each have a core having a diameter less than 8 μm.

14. The differential fiber-optic confocal microscope according to claim 13, wherein said first, second and third single-mode optical fibers each have a core having a diameter of about 3 μm.

* * * * *